United States Patent [19]

Hemperly, Jr.

[11] 4,188,254
[45] Feb. 12, 1980

[54] VACUUM PRESS

[75] Inventor: Lyle D. Hemperly, Jr., Naugatuck, Conn.

[73] Assignee: Seal Incorporated, Naugatuck, Conn.

[21] Appl. No.: 927,331

[22] Filed: Jul. 24, 1978

[51] Int. Cl.² ............................................ B32B 31/00
[52] U.S. Cl. .................................. 156/382; 156/498; 156/583.3
[58] Field of Search ............. 156/583, 498, 382, 583.3

[56] References Cited

U.S. PATENT DOCUMENTS

| | | | |
|---|---|---|---|
| 3,533,352 | 10/1970 | Miller | 156/498 |
| 3,738,890 | 6/1973 | Johnson | 156/382 |
| 3,888,719 | 6/1975 | Gibbs | 156/382 |
| 3,950,210 | 4/1976 | Gibbs | 156/583 |
| 3,951,724 | 4/1976 | Johnson | 156/382 |
| 3,976,533 | 8/1976 | Straüven | 156/498 |
| 4,028,166 | 6/1977 | Leonhart | 156/382 |
| 4,078,962 | 3/1978 | Krueger | 156/583 |

*Primary Examiner*—Douglas J. Drummond
*Attorney, Agent, or Firm*—Schiller & Pandiscio

[57] ABSTRACT

An improved form of vacuum press is disclosed for use in laminating transparent protective film to photographs and the like and for dry-mounting the same to suitable substrates or backing materials.

The press comprises a rigid work support assembly for supporting a workpiece, and a cover assembly hinged to the work support assembly for movement into and out of engagement with the top of the work support assembly, with the cover assembly comprising a frame, a flexible, air-impermeable membrane extending across an interior opening in the frame and attached thereto at its edges, and sealing means for forming an airtight chamber between the work support assembly supporting the workpiece and the cover assembly when the cover assembly is in engagement with the top of the work support assembly. The press also includes evacuating means for removing substantially all the air from the airtight chamber and causing the flexible membrane to collapse under the force of outside atmospheric pressure so as to effectively compress the workpiece within the chamber, and heating and cooling means for selectively heating and cooling the workpiece while under pressure.

18 Claims, 12 Drawing Figures

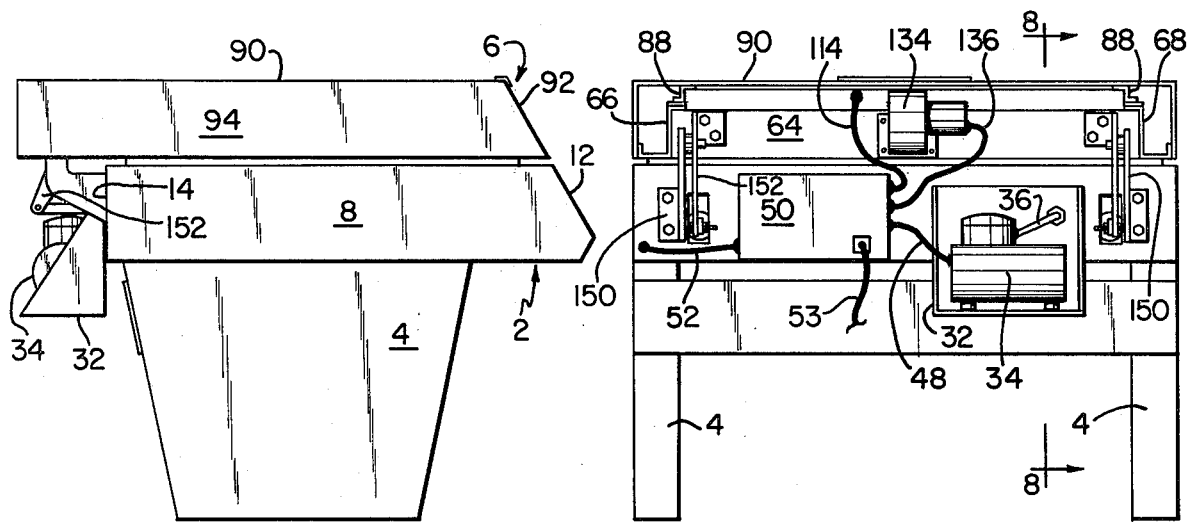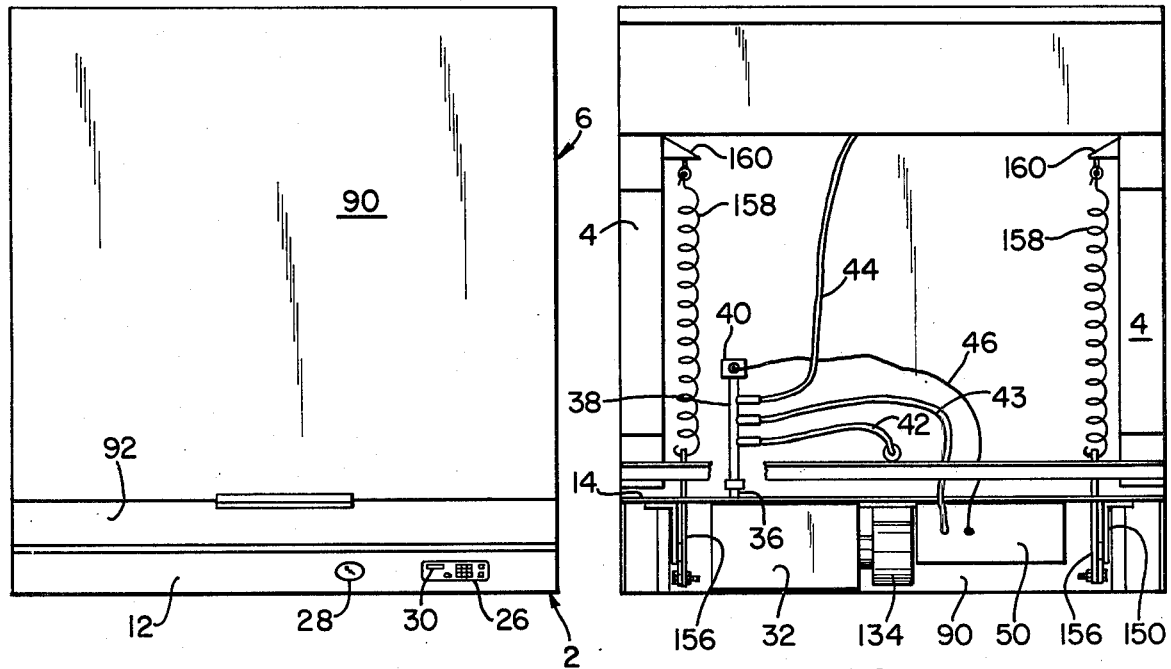

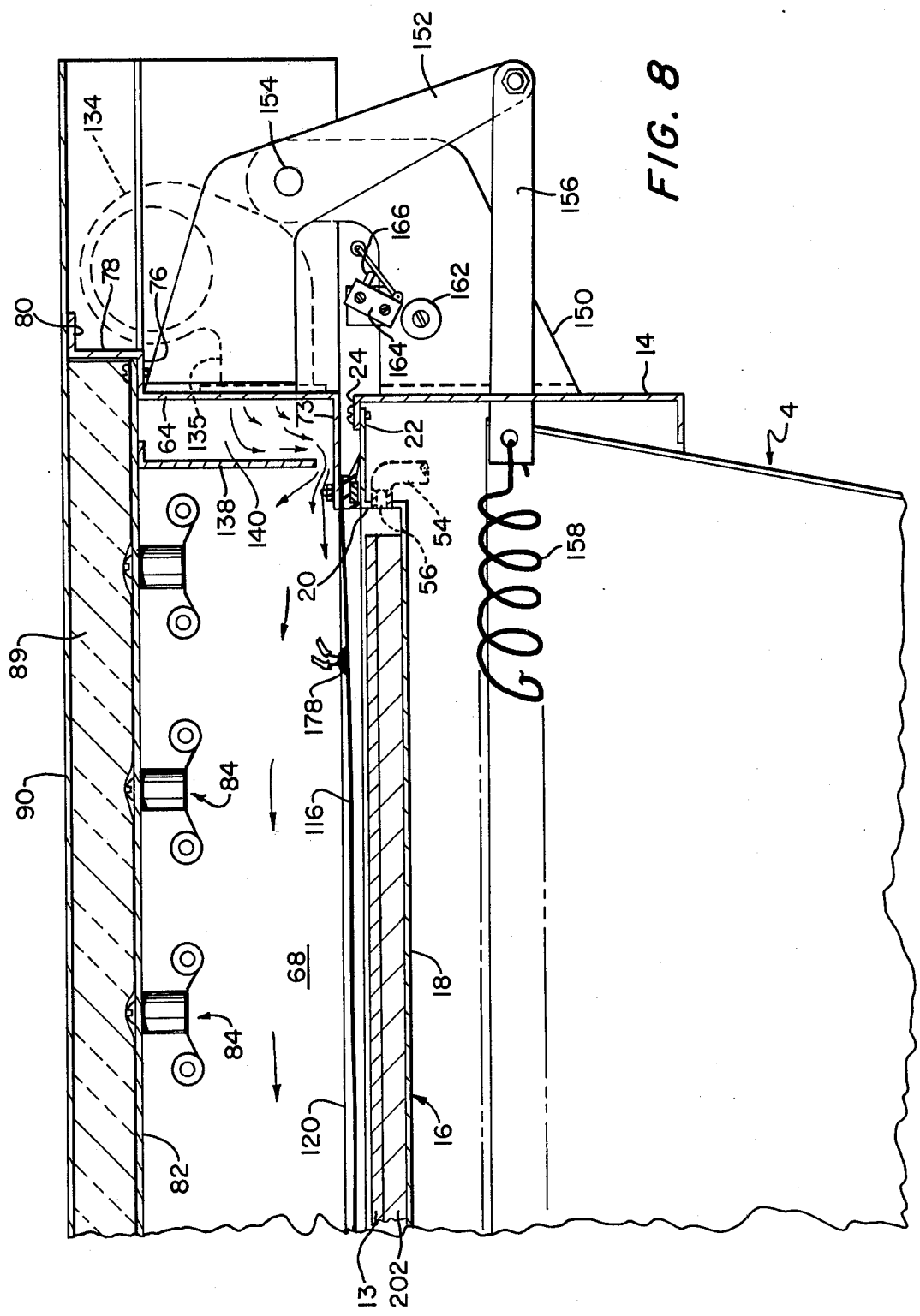

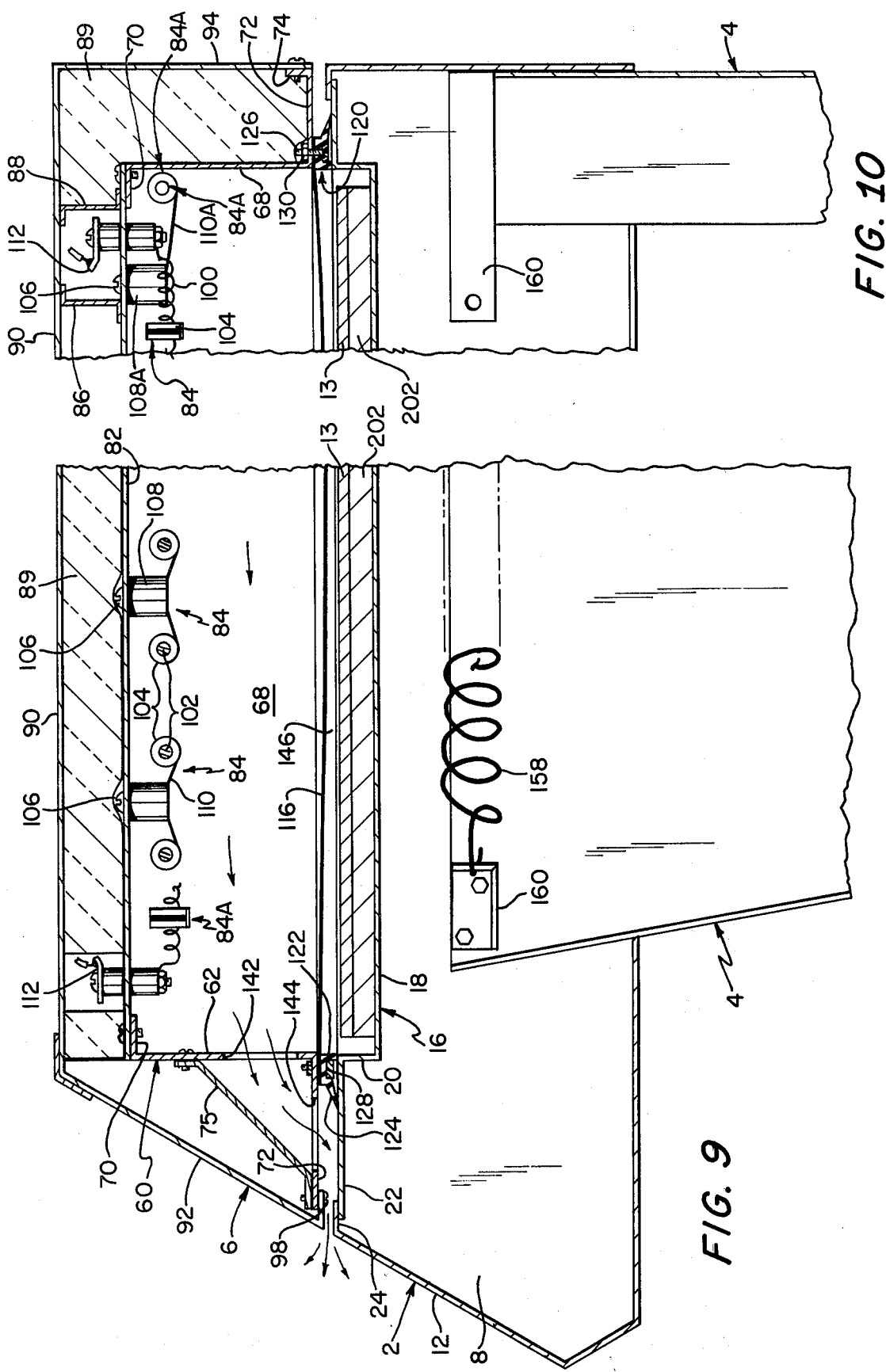

VACUUM PRESS

FIELD OF INVENTION

This invention relates to a new and improved type of vacuum press.

DESCRIPTION OF THE PRIOR ART

Vacuum presses for laminating transparent protective film to photographs and the like and for dry mounting the same to suitable backing materials are well known in the art. Such presses are typically comprised of two hinged members which engage one another so as to form an airtight chamber therebetween for receiving a workpiece, with at least part of the chamber being comprised of a flexible membrane so as to make the chamber substantially contractable. Such presses further include a pump for removing air from the contractable chamber so that atmospheric pressure will cause the chamber to collapse and thereby compress the workpiece so as to facilitate bonding. In addition, one or more heating elements are usually provided to allow the workpiece to be heated while under pressure to assist bonding. A number of different vacuum press designs exist and some of these are shown in the following U.S. Pat. Nos. 3,951,724; 3,888,719; 3,950,210; and 3,738,890 and the publications cited therein.

Unfortunately, a number of problems have been associated with existing vacuum press designs. First, while it has been discovered that better bonding will result if the workpiece is cooled while still under pressure, no presses previously disclosed have made provisions for cooling apparatus to accelerate the natural cooling of the workpiece. As a result, if an operator wishes to cool the workpiece under pressure with existing presses, the operator must spend a good deal of time waiting for natural ventilation to carry off the heat of the workpiece. This delay ties up the press and causes a loss of productivity. On the other hand, opening the press early to facilitate cooling may be detrimental since the workpiece may be disturbed before the bonding adhesive in the workpiece has hardened.

A second problem with the existing presses of the type shown in U.S. Pat. No. 3,950,210, for example, is that the pressure applied is influenced by the weight of the material being worked. Since the flexible membrane is on the bottom and must lift the work up to the platen to effect bonding, the amount of pressure applied by evacuating the work chamber may be as little as 5 pounds per square inch for relatively heavy workpieces. Also, since the flexible membrane is on the bottom, it can be damaged in the course of placing workpieces in or removing them from the press. The problem of possible damage also makes it imperative in prior art presses to mount the sealing strip on the upper platen assembly instead of directly to the membrane.

OBJECTS OF THE PRESENT INVENTION

As a result, the primary object of the present invention is to provide a vacuum press which is able to cool the workpiece under pressure in less time than has previously been possible.

Another object is to provide a vacuum press designed so that the weight of the workpiece will have no affect on the pressure which may be applied to it, and also so that a lip seal of unique and simple form may be attached to the flexible membrane in a simple manner which precludes any leakage of air and also facilitates attachment and removal of the membrane.

Yet another object is to provide a vacuum press which is low in cost, relatively simple in construction and capable of reliable operation.

SUMMARY OF THE PRESENT INVENTION

These and other objects of the present invention are addressed by providing a vacuum press which comprises a rigid work support assembly for supporting a workpiece, and a cover assembly hinged to the work support assembly and adapted for movement into and out of engagement with the top of the work support assembly, with the cover assembly including a frame, a flexible, air-impermeable membrane extending across an interior opening in the frame and attached thereto at its edges, and sealing means for forming an airtight chamber between the work support assembly and the cover assembly when the cover assembly is in engagement with the top of the work support assembly. The press also includes evacuating means for removing air from the airtight chamber and causing the flexible membrane to collapse under the force of outside atmospheric pressure so as to effectively compress the workpiece within the chamber, and heating and cooling means for selectively heating and cooling the workpiece while it is under pressure. Suitable control means for selectively coordinating the heating, cooling and compression of the workpiece may be provided.

THE DRAWINGS

Other features or advantages of the invention are described or rendered obvious in the following detailed description which is to be considered together with the accompanying drawings wherein:

FIG. 4 is a side elevation of the opposite side of the same vacuum press;

FIG. 5 is a rear elevation of the same vacuum press;

FIG. 6 is a top plan view of the same vacuum press;

FIG. 7 is a bottom plan view of the same vacuum press;

FIG. 8 is a fragmentary sectional view in elevation of the rear portion of the press taken along line 8—8 of FIG. 5;

FIG. 9 is a fragmentary sectional view in elevation of the front portion of the press taken along the same line as FIG. 8;

FIG. 10 is a fragmentary sectional view in elevation of one side of the press taken at a right angle to FIGS. 8 and 9.

DETAILED DESCRIPTION OF THE PRESENT INVENTION

Figure 1:
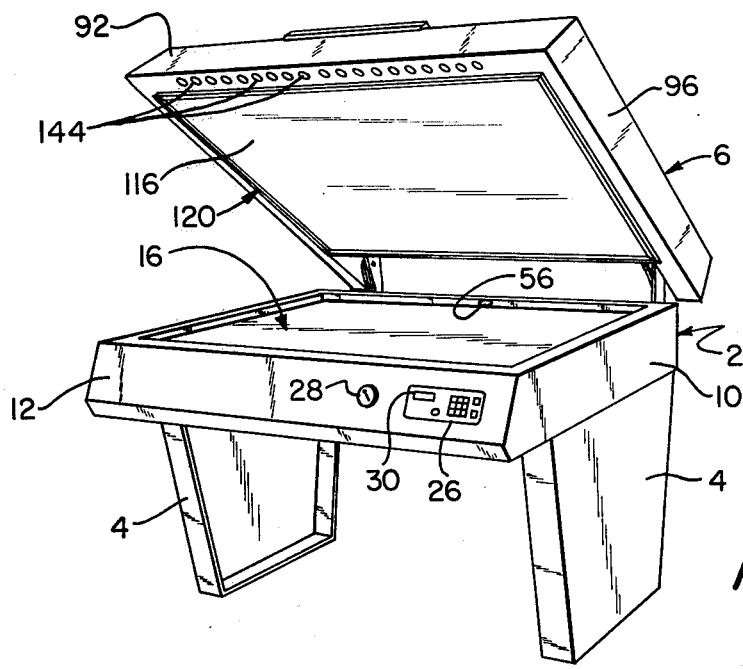
FIG. 1 is a front perspective view of a vacuum press constructed in accordance with the present invention, with the cover assembly in raised position.
Figure 2:
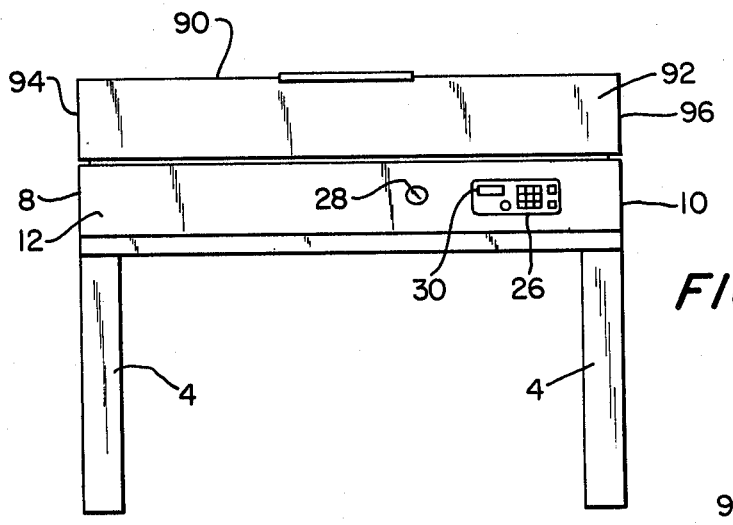
FIG. 2 is a front elevation of the same vacuum press, with the cover assembly in closed position.
Figure 3:
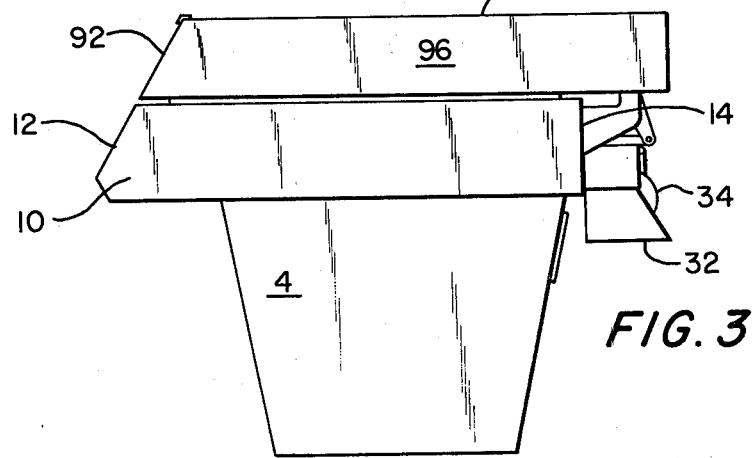
FIG. 3 is a side elevation of one side of the same vacuum press.

Referring first of FIGS. 1–4 and 6, the press generally comprises a work support assembly 2 mounted on a pair of legs 4, and a hinged cover assembly 6. The work support assembly 2 is comprised of opposite side walls 8 and 10, a front wall 12 and a rear wall 14 surrounding and supporting a work support tray 16 for holding work 13 comprising materials to be mounted or laminated. In the illustrated embodiment of the invention, the legs 4 are attached to inner sides of side walls 8 and 10, but the legs could be devised for attachment to front and rear walls 12 and 14 or to structural cross members located below tray 16 and extending between and fastened to walls 8 and 10 and/or walls 12 and 14.

Tray 16 is one piece and comprises a horizontal floor 18 with a vertical wall 20 at each of its four sides and a horizontal flange 22 terminating the upper end of each side wall. Flanges 22 are secured (by welding or by fastening means such as screws and nuts) to internal horizontal lips 24 formed at the upper ends of walls 8, 10, 12 and 14. Flanges 22 are secured to the underside of lips 24 for the purpose (as explained later in greater detail) of helping to avoid damage to the flanges which might affect the quality of the seal made between the work support assembly and the cover assembly when the latter is in closed position. Preferably the entire work support assembly is made of a suitable sheet metal, e.g. steel or aluminum, so as to have suitable strength and rigidity. In this connection it should be understood that tray 16 must be sufficiently stiff so as not to undergo any substantial bending under the load of its contents, i.e., the workpiece and the spacer or cover sheets used in conjunction with the workpiece, and the pressure to which it is subjected during a bonding or laminating operation.

The work support assembly also includes a control and indicator panel 26 mounted in an opening in front wall 12 and provided with one or more visual indicators and suitable operating controls (not shown) for controlling operation of the press. Various types of indicators and controls may be incorporated in the press according to the kind of information and the degree of control desired for the convenience of the operator. Therefore, this invention is not to be construed as requiring any specific quantity or type of indicators and controls. However, to facilitate a full understanding and appreciation of the invention, certain indicators and controls are illustrated and described herein. Thus a pressure gauge 28 is mounted in front wall 12 and connected as hereinafter described so as to provide an indication of the level of vacuum in the airtight work-receiving chamber that is formed when the press is closed. Also a temperature indicator 30 is carried by control panel 26. Other controls are described hereinafter.

Referring now to FIGS. 3–5, 7 and 8, a shelf-like bracket 32 is mounted to the rear wall 14 of the work support assembly, and sitting on that bracket is an electrically powered vacuum pump 34. The suction side of pump 34 is connected to a tube 36 which extends through rear wall 14 and is connected to and supports a manifold 38. The latter is connected to and supports a solenoid operated vent valve 40 and is also connected to three hose lines or pipes 42, 43 and 44. Lines 42 and 44 lead respectively to the pressure gauge 28 mounted in front wall 12 and tray 16. Line 43 is connected to a pressure switch 47 (FIG. 11) mounted in control box 50 which is attached to the rear wall 14 and houses certain of the electrical controls hereinafter described. The solenoid of valve 40 and the motor of vacuum pump 34 are connected by electric cables 46 and 48 to the interior of electrical control box 50. Another cable 52 connects control panel 26 and control box 50. Electric power is supplied to the press via another cable 53 attached to control box 50. Still referring to FIG. 8, a short pipe 54 is attached to the back side of tray 16 and communicates with a hole 56 formed in the rear wall 20 of the tray. The opposite end of pipe 54 is connected to the vacuum pump by hose line 44.

The cover assembly 6 comprises an interior frame (identified generally by numeral 60) made up of front and rear members 62 and 64 and opposite side members 66 and 68 (FIGS. 5 and 9) which are secured together so as to define an opening. Each of the members 62, 66 and 68 comprises a vertically oriented flat body section with an inwardly directed horizontal flange 70 at its upper edge and an outwardly directed flange 72 at its bottom edge. Additionally, the flanges 72 of side members 66 and 68 terminate in upwardly directed vertical lips 74. The lower side of rear frame member 64 also has a horizontal, inwardly-extending flange 73. The upper section of rear frame member 64 is formed with an outwardly (rearwardly) directed horizontal shoulder 76 joined to an upstanding section 78 which terminates in an outwardly directed horizontal flange 80. A bracing strut 75 is preferably provided between flange 72 and the vertical body section of frame member 62 to prevent relative deflection of those sections. Overlying and secured to flanges 70 of frame members 62, 66 and 68 and shoulder 76 of frame member 64 is a flat plate 82. Plate 82 and the frame members to which it is secured are made of metal and preferably the lower surface of plate 82 and the inner mutually confronting surfaces of the frame members have a mirror-like finish so as to serve as reflectors. Plate 82 completely closes off the upper end of the opening formed by the four frame members and thus cooperates therewith to form an inverted open box which serves as a receptacle for a plurality of electrical heating elements identified generally as 84. As seen in FIG. 10, two parallel Z-shaped angle irons 86 and 88 are mounted to the upper side of plate 82 adjacent to side frame member 68; two similar angle irons (not shown) are secured to the upper side of plate 82 adjacent to side frame member 66. These angle irons serve as spacers and supports for the outer shell of the cover assembly and also help to stiffen plate 82, thereby allowing the latter to be made of relatively thin sheet metal and still provide adequate support for the heating elements.

A suitable heat insulating material 89 is disposed in the space between frame assembly 60 and the outer shell of the cover assembly (as shown in FIGS. 8–10) for the purpose of reducing heat loss from the top and sides of the cover assembly. Insulating material 89 also may be disposed between strut 75 and the front wall 92 of the cover shell.

The outer shell of the cover assembly comprises a top wall 90, a front wall 92, and opposite side walls 94 and 96. As seen in FIG. 9, front wall 92 terminates at its lower end in an inturned horizontal flange 98. Sheet metal screw fasteners are used to secure side walls 94 and 96 to lips 74 and flange 98 to front flange 72. The rear side of the cover shell is open. As a consequence, the cover shell is removable simply by removing the screw fasteners which screw it to lips 74 and front flange 72 and then sliding it forward relative to the frame 60 until flange 98 clears front flange 72, after which the shell can be lifted off of the frame.

Still referring to FIGS. 9 and 10, the electrical heating elements 84 are radiant heaters of conventional design, comprising coiled resistance wires 100 and a plurality of surrounding insulating collars 104. The heating elements are suspended from the ceiling plate 82 by means of screws 106, insulators 108, and support bands 110 which are attached to insulator collars 104. The heating elements may be disposed in any convenient arrangement which will assure the proper heat flux pattern; preferably as shown in FIGS. 9 and 10 one heating element 84A (consisting of members 100A, 108A and 110A) is located at each side of the cover frame assembly next to frame members 66 and 68 and is oriented so that it runs fore and aft; the remaining heating elements 84 are disposed at a right angle to heating elements 84A, running side to side parallel to frame members 62 and 64. The various heating elements are connected in parallel to one or more suitable insulated bus bars 112 carried by plate 82. Bus bars 112 are connected by a cable 114 (FIG. 5) to control box 50.

Still referring to FIGS. 8-10, a pliable, heat resistant, air-impermeable sheet or membrane 116 is secured to the underside of flanges 72 and 73 of the four frame members 62, 64, 66 and 68. Membrane 116 closes off the bottom side of the opening formed by the four frame members. Membrane 116 is made of an elastomer, or a material such as a rubber coated loosely woven fabric which is capable of a suitable amount of elastic stretching. Membrane 116 is made large enough so that it is under little or no tension and lies substantially flat as shown in FIGS. 8 and 9, or else has a little droop. Preferably membrane 116 is relatively thin, typically about 0.032 inch thick, so as to facilitate transfer of heat to the workpiece. Membrane 116 must be capable of withstanding the operating temperatures of the press (typically temperatures as high as 400° F.) without degradation. A silicon rubber is preferred but other pliable heat resistant materials also may be used.

Underlying the margins of membrane 116 is a lip seal member 120 which is made of a resilient material, preferably an elastomer such as a silicone rubber. The seal member also may be made of other resilient materials capable of providing a suitable degree of flexibility, compressibility and resistance to repeated heating and cooling. A seal member made of a silicone rubber is preferred. As seen in FIGS. 8-10, seal member 120 comprises a flat body section 122 and a tapered lip section 124 which is formed at an angle to the body section. Preferably the lip section is formed so that in its normal undeflected state it extends down at an angle of about 40 degrees to the flat bottom surface of body section 122. Seal member 120 extends for the full length of each edge of membrane 116, being secured to the frame members 62, 64, 66 and 68 by screws 126 which pass through matching holes in flat metal pressure strips 128, the seal member, the margins of the membrane and flanges 72 and 73, and are screwed into nuts 130. The latter may but need not be welded or otherwise fixed to flanges 72 and 73. The seal member may be molded as one unit, i.e., as a closed four-sided ring, or it may be assembled from several separately molded strips of suitable lengths. A sealing cement preferably is applied between seal member 120, membrane 116 and flanges 72 and 73 to prevent any air leakage between them.

The cover assembly is hinged to the work support assembly by two identical hinge mechanisms, each of which comprises an angular support arm 150 attached to the rear wall 14, an angular lever arm 152 affixed to the rear frame member 64, and a pivot rod 154 pivotally connecting the arm 152 near its midpoint with the free end of arm 150. The free end of each lever arm 154 is pivotally connected to one end of a slide rod 156 which slidably extends through a slot in rear wall 14 and is connected at its front end to a tension spring 158. The front end of each spring 158 is connected to brackets 160 which are affixed to and extend inwardly of legs 4. Springs 158 are arranged so that they nearly counterbalance the cover assembly and thereby facilitate raising the latter. Due to the disposition of the pivot points 154 and the particular angulation of lever arms 152, the springs 158 cause the cover assembly to tend to remain in open position, while little manual effort is required to pull the cover assembly down to closed position. Opening movement of the cover assembly is limited by two stops in the form of resilient bumpers 162 which are attached to support arms 150 in position to intercept the lever arms 152 when the cover assembly is raised to an angle of about 60-75 degrees.

A limit switch 164 also is mounted on one of the support arms 150 in position for its operating finger 166 to be engaged by the associated lever arm 152 just before the latter is intercepted by bumper 162.

Still referring to FIGS. 5 and 7-9, an electrically operated blower 134 is secured to rear frame member 64 of the cover assembly and connected by a cable 136 to control box 50. The rear frame member 64 has an aperture (not visible in the drawings) which is in registration with the discharge nozzle 135 of blower 134. A partition member 138 is located forwardly of frame member 64 and secured to plate 82 so as to form an air chamber or plenum 140 to receive air discharged by blower 134. The lower edge of partition member 138 is spaced from flange 73 of rear frame member 64 a suitable distance, e.g., ½ inch, so as to form a passageway leading from the plenum into the chamber forwardly of the partition. Preferably also, the opposite ends of partition 138 are spaced from the side frame members 66 and 68 so that air can flow from the plenum around the two ends of the partition as well as under its bottom edge.

Still referring to FIG. 9, the body section of front frame member 62 is formed with a plurality of openings 142, and a corresponding member of similarly sized openings 144 are formed in flange 72 of the same frame member, thereby providing a plurality of passageways through which air can pass out of the cover assembly. Seal member 120 is sized so that when the flat pressure strips 128 are engaged with tray flanges 22, a gap will exist between flange 72 of front frame member 62 and the confronting front tray flange 22, thereby providing an escape path for air discharged from apertures 144. The lip section 124 of the seal member is deflected upwardly by flange 22 when the press is closed, and the weight of the cover assembly and the reduced pressure between the tray and cover assembly (due to operation of vacuum pump 34), coupled with the inherent resiliency of the seal member, will cause the deflected lip section to press down and make a tight seal with flange 22, with the result that an airtight chamber 146 is formed by membrane 116 and tray 16.

Figure 11A:
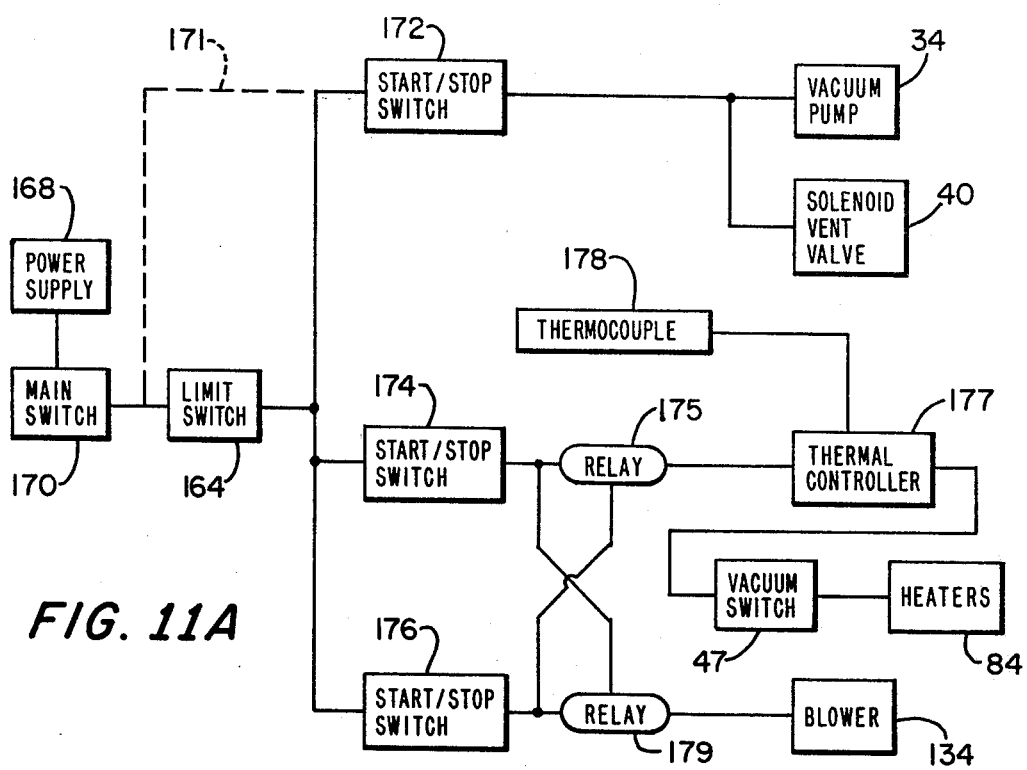
FIGS. 11A and 11B are schematic diagrams of two control systems for the press.

FIG. 11A illustrates a control system for manual operation of the above-described press. An exterior power supply 168 is connected by power line 53 to a main switch 170. The latter is mounted in the control panel 26 and is connected to one side of limit switch 164 which is normally open. The other side of switch 164 is connected to three manually operable start/stop switches 172, 174 and 176. Switch 172 is connected to vacuum pump 34 and the solenoid of vent valve 40. Switch 174 is connected by a relay 175 to an adjustable thermal controller 177 which may be mounted in the front control panel 26 and is connected so as to respond to a thermocouple 178 that is situated in the cover assembly and attached to the upper side of the membrane 116 as illustrated in FIG. 8. The controller is connected to a normally open vacuum switch 47 which is located in control box 50 and is connected to heaters 84. Relay 175 has normally closed contacts and is connected so that its contacts will open when switch 176 is closed. Switch 176 is connected by a relay 179 to blower 134. Relay 179 has normally closed contacts and is connected so that its contacts will open when switch 174 is closed. Thus relay 179 serves to prevent operation of blower 134 when the heaters are being energized, and relay 175 serves to prevent operation of the heaters when the blower is on.

The circuit of FIG. 11A allows the operator independent control of vacuum pump 34, heaters 84 and blower 134. In the arrangement of FIGS. 11A, limit switch 164 renders vacuum pump 34, heaters 84 and blower 134 inoperative so long as the cover assembly is not in closed position. If desired, start/stop switch 172 may be wired as shown by broken line 171 so as to bypass limit switch 164, thereby permitting the vacuum pump to be operated regardless of the position of the cover assembly. When switch 172 is closed, it energizes the vacuum pump 34 and closes solenoid vent valve 40, thereby causing the vacuum pump to suck air from the tray via the line 44. Of course, when the cover assembly is in raised position, turning the vacuum pump on results in no vacuum being established between the tray 16 and the membrane 116. In the usual manual operation, the work 13 to be bonded or laminated is placed in tray 16, the controller 177 is set for the proper maximum operating temperature, the switch 172 is closed, and the cover assembly is lowered so as to place the seal member 120 in engagement with the flange 22 of tray 16. When the cover assembly is in closed position, the vacuum pump creates a suction force which (1) causes seal member 120 to be pulled tightly against flange 22 and thereby locking the cover assembly in closed position, and (2) causes membrane 116 to be drawn down against the work and the exposed portions of inner surfaces of the tray and placing the workpiece under compression due to the differential between the atmospheric pressure on the upper side of the membrane and the reduced pressure in the chamber 146. Thereafter, switch 174 is closed to energize the heaters. If a sufficient vacuum exists in the airtight chamber 146, vacuum switch 47 will close and the heaters 84 will be energized. The heaters will remain energized until the temperature sensed by the thermocouple reaches the temperature at which the controller is preset, whereupon the controller will interrupt the circuit between relay 175 and vacuum switch 47 to deenergize the heaters 84. The controller will cycle the heaters on and off to keep the thermocouple at the preset temperature. The heaters 84 also will be deenergized by reopening of switch 47 in the event that the vacuum in the work receiving chamber 146 is broken. During the time that the heaters are energized, the blower 134 cannot be operated due to relay 179 being open as a consequence of the closing of switch 174. After the work has been heated for a desired period of time as determined by the operator, switch 174 is opened and switch 176 is closed, thereby causing the heaters to be deenergized and the blower 134 to be turned on. The blower is operated until the temperature of the press has been decreased to a suitable level, at which time the operator opens switch 176 to turn off the blower and opens switch 172 to turn off the vacuum pump and open solenoid valve 40. When solenoid valve 40 is opened, the vacuum in the work receiving chamber 146 is broken, thereby releasing the cover assembly and allowing the springs 158 and the associated hinge mechanism to raise the cover assembly to fully open position, after which the work may be removed from the press.

Figure 11B:
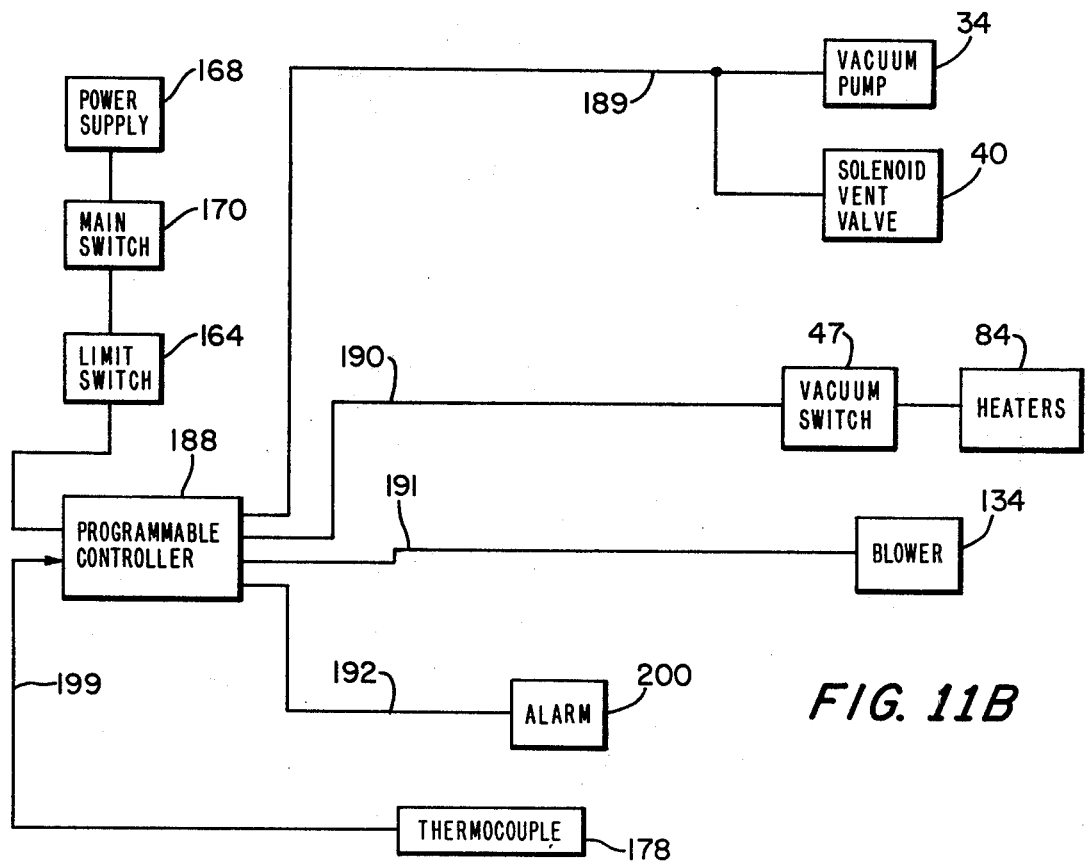

FIG. 11B illustrates a circuit providing for automatic operation of the press. In this case the limit switch is connected to a programmable controller 188 which may be a motor operated electromechanical controller or a digital controller embodying an electronic microprocessor and associated memory circuits. Controller 188 has a plurality of output lines 189, 190, 191 and 192. Output line 189 is connected to operate vacuum pump 34 and solenoid vent valve 40. Output line 190 is connected by vacuum switch 47 to heaters 84. Output line 191 is connected to blower 134. Output line 192 of controller 188 is connected to an alarm 200 which may be a visual indicator such as a light but preferably is an audible alarm such as an electrically powered buzzer. Thermocouple 178 is connected to an input terminal of controller 188 by a line 199. The programmable controller is of a type which is adapted to produce output signals on lines 189, 190, 191 and 192 at selected times and also can be programmed to (1) turn off heaters 84 when a selected temperature is sensed by thermocouple 178, (2) cycle heaters 84 so as to maintain the thermocouple at that selected temperature and (3) turn off the heaters and turn on the blower at a predetermined time after that selected temperature is sensed by the thermocouple. Automatic operation requires programming the selected temperature and the time of heating at that preset temperature into the controller. The lid is then manually closed and held momentarily, whereby the controller is caused to start a cycle of operation in which the first step is to turn on the vacuum pump so as to create a vacuum. The vacuum thus created acts to hold the lid down during the entire cycle. The controller then closes a circuit to energize the heaters 84 as the membrane is being pulled tightly against the work and tray 16. The controller maintains the heaters energized continuously until the preset temperature is reached, after which the heaters are cycled by the controller in response to the output signal from thermocouple 178 so as to maintain the preset temperature while the controller counts down the time of heating at that temperature. After maintaining the work at the preset temperature for the preset time, the controller acts to turn off the heater and automatically turn on the blower. The blower pumps air through the cover assembly, thereby rapidly cooling the work by conduction of heat through the membrane 116. After the temperature sensed bvy the thermocouple has dropped to a predetermined level, controller 188 turns off blower 134 and also produces a signal on line 192 to operate the alarm 200 for a predetermined period, e.g., ten seconds. Simultaneously, the controller produces an output signal on line 189 turning off vacuum pump 34 and opening vent valve 40. The rapid reduction in pressure in the work receiving chamber 146 causes the cover assembly to automatically open. All that is required of the operator to do another bonding or laminating procedure is to replace the work in the press and close the lid.

Obviously, the control system for the machine may combine circuits as represented in FIGS. 11A and 11B so as to afford the operator either independent manual control of the pump, heater and fan or automatic control as above described.

It is to be understood that a press constructed as above described offers a number of advantages. For one thing, the press may be made in various sizes and the tray may be made in various depths. Since the bottom wall 18 of the tray is fixed, a spacer member 202 may be required to be placed in the tray in the case where the work is relatively thin, thereby minimizing the extent to which the membrane 116 must be pulled down in order to compress the work. For thicker workpieces, the spacer 202 may be omitted or replaced by a spacer which is relatively thin. A further advantage of the press is that the heating can be accomplished rapidly and with a selected heat flux pattern. In this connection it is to be noted that the heater elements 84 may be mounted so as to provide a uniform or non-uniform heat flux pattern over the expanse of the membrane 116, according to the rate of heat loss from the space above the membrane 116 through the frame members 62, 64, 66 and 68 and the associated members of the cover assembly. A further advantage is that the insulation 89 may be a material such as rock wool or fiber glass wool, or it may be an insulation in sheet form. The rate of cooling also may be appropriately adjusted by the size of the blower 134 and the speed at which the blower is operated (variable speed blower may be used). This adaptability of the blower to vary the cooling rate is advantageous since in certain cases it may be advantageous to cool the work at a relatively slow rate, while in other cases it may be advantageous to cool the work rapidly. Still another advantage is that the hinge mechanism is relatively simple and the cover assembly may be retained in closed position without the need for auxiliary locking mechanism. However, if desired, a locking mechanism could be attached to the press for holding the cover assembly down while a vacuum seal is being created.

Still another advantage is that the flange 22 of the tray is disposed below the level of the flange 24. This minimizes damage to the upper surface of flange 22 by the work or components thereof as the work is being placed in or withdrawn from the tray 16. Avoiding damage to the upper surface of flange 22 is important since a smooth surface facilitates an airtight engagement of the seal member with flange 22. Still another advantage is that the press may be made in various sizes without substantially altering the construction of the press. Other advantages and possible modifications of the press will be obvious to persons skilled in the art.

What is claimed is:

1. A vacuum press comprising:
   a work support assembly including a substantially rigid surface for supporting a workpiece;
   a cover assembly disposed above and hingedly connected to said work support assembly so as to be movable into and out of engagement with said work support assembly, said cover assembly comprising a frame defining an opening, a pliable, air-impermeable sheet extending across said opening and secured at its edges to said frame, and electrical heater means for heating said workpiece disposed within said opening above said pliable sheet;
   means carried by said cover assembly for sealing together said work support assembly and said cover assembly when mutually engaged so as to provide an airtight chamber between said surface and said pliable sheet;
   means for evacuating said chamber so that the atmospheric pressure exterior of said chamber will force said pliable sheet towards said surface and thereby compress a workpiece supported on said surface;
   cooling means including a blower for circulating a flow of cool air through said cover assembly over said pliable sheet;
   control means for operating said electrical heater means, said evacuating means and said blower so that a workpiece captivated in said chamber may alternately be heated under compression and cooled under compression.

2. A vacuum press according to claim 1 wherein said cooling means comprises means for directing said flow of cool air between said heater means and said sheet.

3. A vacuum press according to claim 1 wherein said blower is attached to and supported by said cover assembly.

4. The vacuum press according to claim 3 wherein said cover assembly has a front end and a rear end, and said blower is mounted so as to direct air from said rear end to said front end.

5. A vacuum press according to claim 4 wherein the rear end of said cover assembly is hinged to said work support assembly.

6. A vacuum press according to claim 1 wherein said sealing means comprises a resilient strip with a lip attached to said cover assembly frame and engaging said air-impermeable sheet, said strip being arranged so that said lip is sealably compressed against said work support assembly when said cover assembly is engaged with said work support assembly.

7. A vacuum press according to claim 6 wherein said work support assembly comprises means forming a tray with a peripheral flange, and further wherein said lip makes a sealing engagement with said flange about the full perimeter of said tray when said cover assembly is lowered down over said work support assembly.

8. A vacuum press according to claim 1 wherein said heater means comprises at least one radiant heater and a reflector mounted over said at least one heater for directing heat through said flexible sheet to said workpiece.

9. A vacuum press according to claim 1 wherein said frame comprises reflecting surfaces defining said opening, and said cover includes a wall member with another reflecting surface closing off one end of said opening and said pliable sheet closes off the opposite end of said opening, and said heater means comprises a plurality of electrical heating elements attached to said wall member.

10. A vacuum press according to claim 9 wherein said cover assembly comprises a shell disposed outside of and attached to said frame, and further including insulation means between said shell and said frame.

11. A vacuum press according to claim 1 wherein said cover assembly has a front end and a rear end and said rear end is hinged to said work support assembly, said blower is mounted so as to direct air from said rear end to said front end and said cover assembly has at least one opening at said front end for discharging air supplied by said blower.

12. A vacuum press according to claim 11 wherein said cover assembly comprises means forming a plenum for receiving air supplied by said blower via a first passageway and discharging air over said pliable sheet via a second passageway.

13. A vacuum press according to claim 12 wherein said cover assembly comprises a wall which overlies and is spaced from the work support assembly when the cover assembly is engaged with said work support assembly, and at least one passageway including a port in said wall for discharging air introduced by said blower after such air has passed over said pliable sheet.

14. A vacuum press according to claim 1 wherein said control means comprises means for preventing simultaneous operation of said electrical heater means and said blower.

15. A vacuum press according to claim 1 wherein said control means comprises means for preventing operation of said heater means when said cover assembly and work support assembly do not form said airtight chamber.

16. A vacuum press according to claim 15 comprising means for preventing simultaneous operation of said blower and said electrical heater means.

17. A vacuum press according to claim 16 further including means for preventing operation of said blower when said cover assembly and said work support assembly do not form said airtight chamber.

18. A vacuum press according to claim 17 wherein said means for evacuating said chamber comprises a vacuum pump supported by said work support assembly.

* * * * *